(12) United States Patent
Castan et al.

(10) Patent No.: US 8,186,922 B2
(45) Date of Patent: May 29, 2012

(54) MULTI-PIECE LOCATING PIN

(75) Inventors: Joel Castan, Chantraine (FR);
Dominique Armand, Thaon les Vosges (FR); Arnaud Gerard, Thaon les Vosges (FR); Franck Blaise, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 942 days.

(21) Appl. No.: 12/132,123

(22) Filed: Jun. 3, 2008

(65) Prior Publication Data

US 2009/0293257 A1    Dec. 3, 2009

(51) Int. Cl.
F16B 35/00    (2006.01)

(52) U.S. Cl. ........................................................ 411/393

(58) Field of Classification Search ............... 411/21, 411/354, 366, 383, 393, 424; 29/464; 415/182.1; 403/13, 14, 408.1
See application file for complete search history.

(56) References Cited

U.S. PATENT DOCUMENTS

| | | | | |
|---|---|---|---|---|
| 1,394,608 A * | 10/1921 | Davern | ........................... | 411/390 |
| 2,993,950 A * | 7/1961 | Forman | ...................... | 174/138 D |
| 3,747,168 A * | 7/1973 | Snarskis | ....................... | 411/349 |
| 3,817,146 A * | 6/1974 | Scott | .............................. | 411/384 |
| 4,022,099 A * | 5/1977 | Ballantyne | .................... | 411/383 |
| 4,325,665 A * | 4/1982 | Jukes | ............................ | 411/176 |
| 4,858,601 A * | 8/1989 | Glisson | .......................... | 606/916 |
| 5,145,334 A | 9/1992 | Gutknecht | | |
| 5,244,323 A * | 9/1993 | Tucchio | ......................... | 411/271 |
| 5,318,375 A | 6/1994 | Entrup et al. | | |
| 5,681,135 A * | 10/1997 | Simonson | .......................... | 411/5 |
| 6,116,832 A * | 9/2000 | Wolf et al. | ..................... | 411/383 |
| 6,439,817 B1 * | 8/2002 | Reed | .............................. | 411/110 |
| 7,407,354 B2 * | 8/2008 | Rau et al. | ....................... | 411/383 |
| 7,530,775 B2 * | 5/2009 | Jaconelli et al. | .............. | 411/383 |
| 7,588,402 B2 * | 9/2009 | Chuang et al. | ............. | 411/387.1 |
| 2005/0169729 A1 * | 8/2005 | Nowak | ........................... | 411/402 |

FOREIGN PATENT DOCUMENTS

| | | |
|---|---|---|
| DE | 1793166 | 8/1959 |
| EP | 1705393 | 9/2006 |

OTHER PUBLICATIONS

EP-SR (Honeywell).

* cited by examiner

*Primary Examiner* — Victor Batson
*Assistant Examiner* — Roberta Delisle
(74) *Attorney, Agent, or Firm* — Brian Pangrle

(57) ABSTRACT

An exemplary multi-piece locating pin for a turbocharger assembly includes a screw piece with a nub and a securing feature to secure the screw piece in a housing of a turbocharger assembly and a pin piece with a receptacle configured to receive the nub and a locating surface to locate a bearing in a bore of the housing. An exemplary turbocharger assembly includes a housing with a bore, a bearing positioned in the bore where the bearing has a wall opening and a multi-piece locating pin secured to the housing and inserted at least partially in the wall opening to axially locate the bearing in the bore. Other exemplary pins, arrangements and methods are also disclosed.

6 Claims, 6 Drawing Sheets

TURBOCHARGER ASSEMBLY 100

REGION 4: EXCESS
REGION 3: LOCATING
REGION 2: TRANSITION
REGION 1: SECURING

EXEMPLARY MULTI-PIECE LOCATING PIN 200

EXEMPLARY BROKEN NUB ARRANGEMENT 400

EXEMPLARY BROKEN, CAPTIVE NUB ARRANGEMENT
500

MULTI-PIECE LOCATING PIN

BACKGROUND

Some turbocharger assemblies include a so-called "Z bearing" to support a rotational shaft for a compressor wheel and turbine wheel. Such a bearing is typically located in a center housing of a turbocharger assembly by a unitary locating pin. During operation of a turbocharger, various forces can act on the bearing. To prevent unacceptable movement of the bearing, the locating pin must be sufficiently durable. Further, clearances associated with the locating pin should be chosen to prevent movements that could cause excessive wear over numerous operational cycles. Yet further, the material of construction of the locating pin must be chosen to handle the forces over a lifetime of the turbocharger assembly. As described herein, an exemplary multi-piece locating pin can address various issues associated with conventional unitary locating pins.

DESCRIPTION OF DRAWINGS

Non-limiting and non-exhaustive examples are described with reference to the following figures.

DETAILED DESCRIPTION

Figure 1:
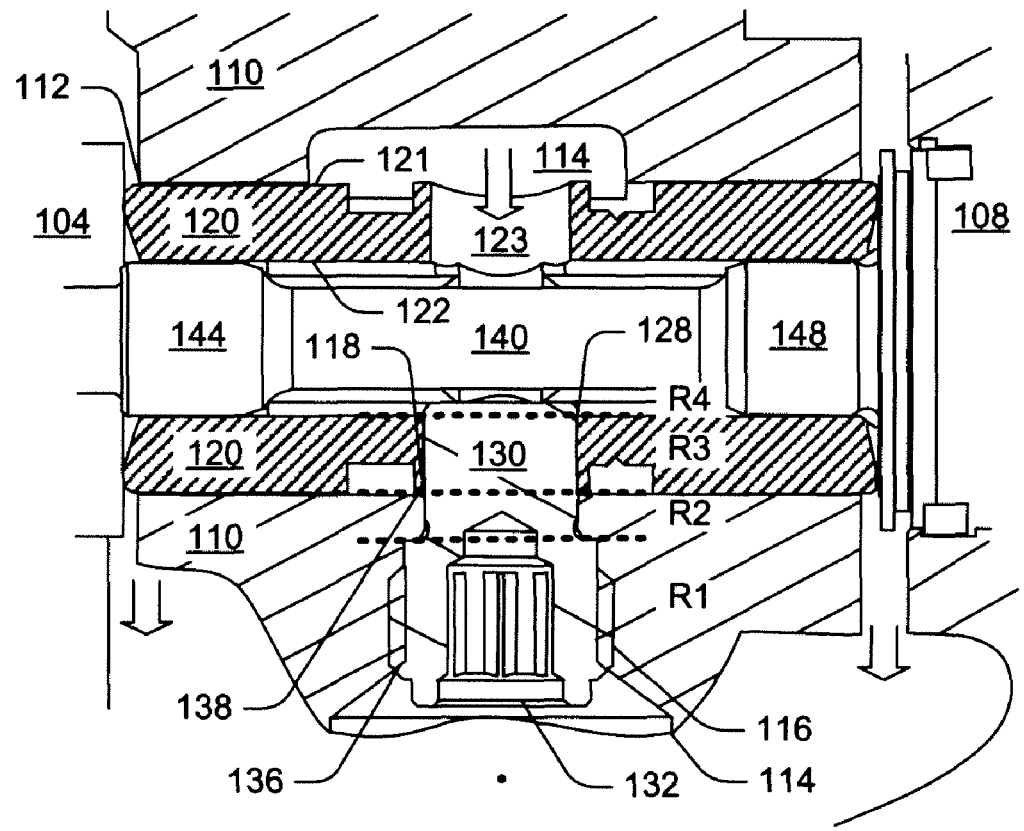
FIG. 1 is a diagram of a conventional turbocharger assembly with a conventional unitary locating pin.
Figure 1:
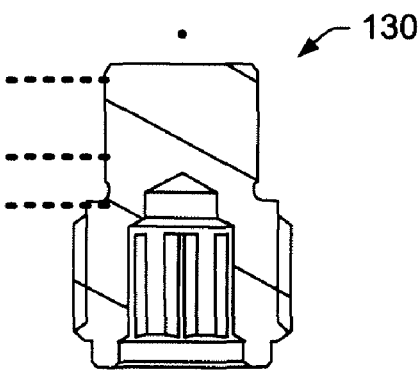

FIG. 1 shows a prior art assembly 100 for a turbocharger (e.g., a turbocharger assembly). The assembly 100 has a compressor side 104 and a turbine side 108 with a center housing 110 disposed between these two sides. The housing 110 includes a substantially cylindrical surface 112 that defines a bore. The surface 112 is typically disposed at a substantially constant radius about a central axis (e.g., which coincides with a rotational axis of the turbocharger). The bore defining surface 112 meets another surface 114 that extends less than 360° around the central axis and includes a radius that exceeds the bore radius so as to define a lubricant well for the bore.

As shown in FIG. 1, a bearing 120 is seated in the bore. The bearing 120 has a substantially cylindrical wall defined largely by an outer surface 121 and an inner surface 122. The outer surface 121 is disposed at an outer radius about a central axis of the bearing 120 and the inner surface 122 is disposed at an inner radius about the central axis. The radius of the outer surface 122 is less than the radius of the bore surface 112 and greater than the radius of the inner surface 122.

The difference in the radii of the bore surface 112 and the outer surface 121 of the bearing define a lubricant film thickness that can help damp movement of the bearing 120 in the housing 110. An opening 122 in the wall of the bearing 120 allows lubricant to flow from the lubricant well defined by surface 114 to the inner surface 122 and correspondingly to a shaft bore defined by the inner surface 122.

In FIG. 1, a shaft 140 is shown positioned in the shaft bore of the bearing 120. The shaft 140 has a compressor side journal surface 144 and a turbine side journal surface 148. The surfaces 144 and 148 are typically disposed at a common radius about a rotational axis of the shaft 140. The common radius of the journal surfaces 144 and 148 is less than the inner radius of 122 of the bearing 120. The difference in radii define a lubricant film thickness to lubricate the journal surfaces 144 and 148 as the shaft rotates in the bearing 120.

In the assembly 100 of FIG. 1, axial movement (e.g., translational movement) and rotational movement of the bearing 120 are limited by a locating pin mechanism. The locating pin mechanism relies on features of the housing 110, features of the bearing 120 and a locating pin 130. The housing 110 includes an opening 114 and threads 116 and a pilot surface 118. The bearing 120 includes an opening 128. The locating pin 130 includes a tool receptacle 132, threads 136 and a locating surface 138. These features of the housing 110, the bearing 120 and the pin 130 may be further defined by four regions R1, R2, R3 and R4 where R1 is referred to as a securing region, R2 is referred to as a transition region, R3 is referred to as a locating region and R4 is referred to as an excess region, which may or may not exist depending on dimensions of the various features. The housing 110 and the pin 130 include the securing region R1 and the transition region R2 while the bearing 120 and the pin 130 include the locating region R3.

Upon insertion of the pin 130 into the opening 114 of the housing 110, the locating surface 138 of the pin 130 is preferably aligned with the opening 128 of the bearing 120 to axially locate the bearing 120 in the bore of the housing 110 and to limit rotation of the bearing 120 about its axis. A tool may be positioned in the tool receptacle 132 of the pin 130 to rotate the pin 130 about a rotational axis. Accordingly, in the securing region R1, the threads 116 of the housing cooperate with the threads 136 of the locating pin 130 to secure the pin 130 in the housing 110.

As the turbocharger shaft 140 may rotate at speeds in excess of 100,000 RPM, features of the housing 110, the bearing 120, the pin 130 and the shaft 140 must be accurately dimensioned. In the assembly 100, the pin 130 plays an important role in locating the bearing 120 in the housing 110. For example, an assembly process may position the bearing 120 in the housing 110 along with the shaft 140, which, in turn is assembled with compressor and/or turbine components. When the pin 130 is inserted in the housing 110, the opening 128 of the bearing 120 and the opening defined by the pilot surface 118 of the housing 110 may not align. In other words, the axis of the opening 128 may be offset from the axis of the opening defined by the pilot surface 118. Hence, upon insertion and securing of the pin 130, the pin 130 may cause the bearing 120 to shift in the bore of the housing 110. Alternatively, the pin 130 may not fit appropriately, which may require disassembly and reassembly of at least some components of the assembly 100. Yet further, an improper fit may cause wear of the housing 110, the bearing 120 and/or the pin 130 when securing the pin 130 (e.g., due to rotation and translation of the pin 130). Such uncertainty as to fit or lack of appropriate fit can cause manufacturing delays and waste. As described herein, an exemplary multi-piece locating pin can address such issues.

Figure 2:
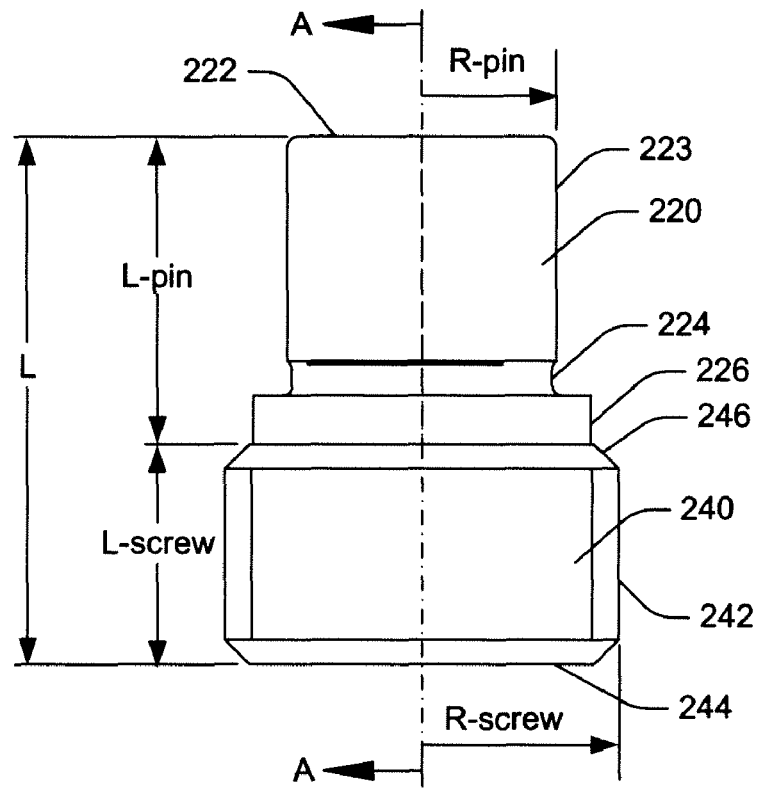
FIG. 2 is a side view and a cross-sectional view of an exemplary multi-piece locating pin.
Figure 2:
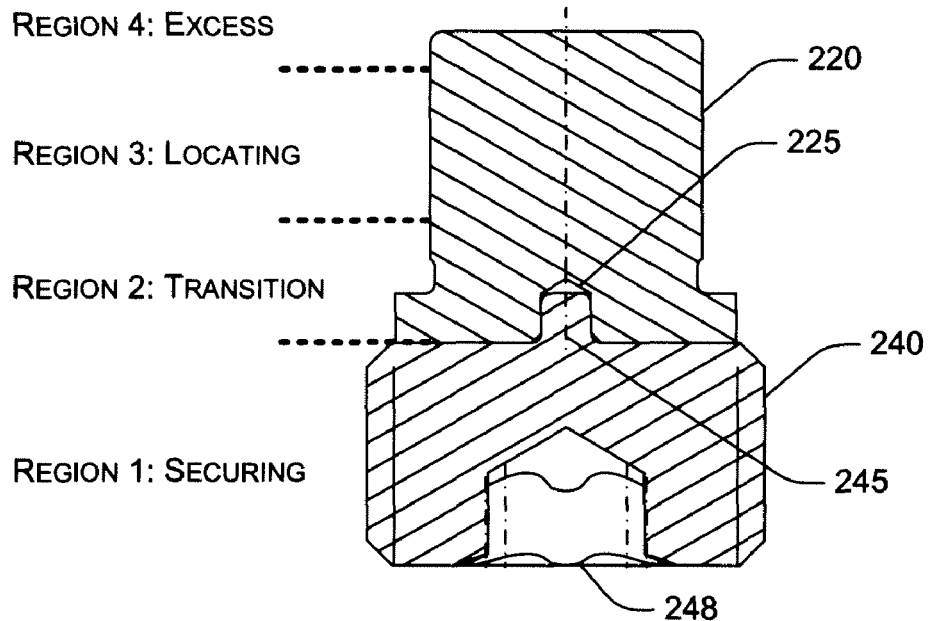

FIG. 2 shows two views of an exemplary multi-piece locating pin 200 (a side view and a cross-sectional view along line A-A). The pin 200 includes a pin piece 220 and a screw piece 240. The pin piece 220 includes a locating surface 223 that acts to locate a bearing in a housing while the screw piece 240 includes a securing feature 242 that acts to secure the pin piece 220 in the housing. The pin piece 220 and the screw piece 240 cooperate via a receptacle 225 and a nub 245 arrangement. In the example of FIG. 2, the screw piece 240 includes a nub 245 while the pin piece includes a receptacle 225 configured to receive the nub 245. In the example of FIG. 2, the receptacle 225 and the nub 245 are substantially aligned on an axis of the multi-piece locating pin 200. The configuration of the receptacle 225 and the nub 245 may allow for rotation of nub 245 in the receptacle 225, for example, as the screw piece 240 is rotated. Such an optional arrangement allows the pin piece 220 to be inserted without any significant rotation of the pin piece 220.

The nub 245 may have any of a variety of shapes. For example, the nub 245 may be cylindrical. Alternatively, a nub may have a polygonal cross-section. Similarly, the receptacle 225 may be a cylindrical void defined by a cylindrical surface. The depth of a receptacle is typically deeper than the length of a nub to allow for full insertion of the nub in the receptacle. In yet another alternative arrangement, a screw piece may have a receptacle and the pin piece a nub. However, as the pin piece may be made of a more durable material than the screw piece, the arrangement of FIG. 2 is preferred. Another arrangement includes a screw piece with a receptacle and a pin piece with a receptacle and another piece that fits into both receptacles to allow for positioning or binding of the screw piece and the pin piece.

The multi-piece locating pin 200 (MPLP) has an overall length L where the pin piece 220 has a length L-pin and a radius R-pin and where the screw piece 240 has a length L-screw and a radius R-screw.

The pin piece 220 has a locating portion 222 adjacent a smaller radius waist portion 224 adjacent a shoulder portion 226 that abuts the screw piece 240. The screw piece 240 has threads or other securing feature 242 disposed between a head end 244 and a pin end 246. In the example of FIG. 2, the head end 244 includes a tool receptacle 248 to receive a tool (e.g., a hex wrench, etc.).

In the example of FIG. 2, the screw piece 240 includes a securing region (R1) while the pin piece 220 includes a transition region (R2), a locating region (R3) and optionally an excess region (R4). Upon insertion of the MPLP 200 in a housing of a turbocharger assembly (see, e.g., the assembly 100 of FIG. 1), the regions R1, R2, R3 and R4 generally align with corresponding regions of the housing and bearing to thereby locate the bearing in the housing.

Figure 3:
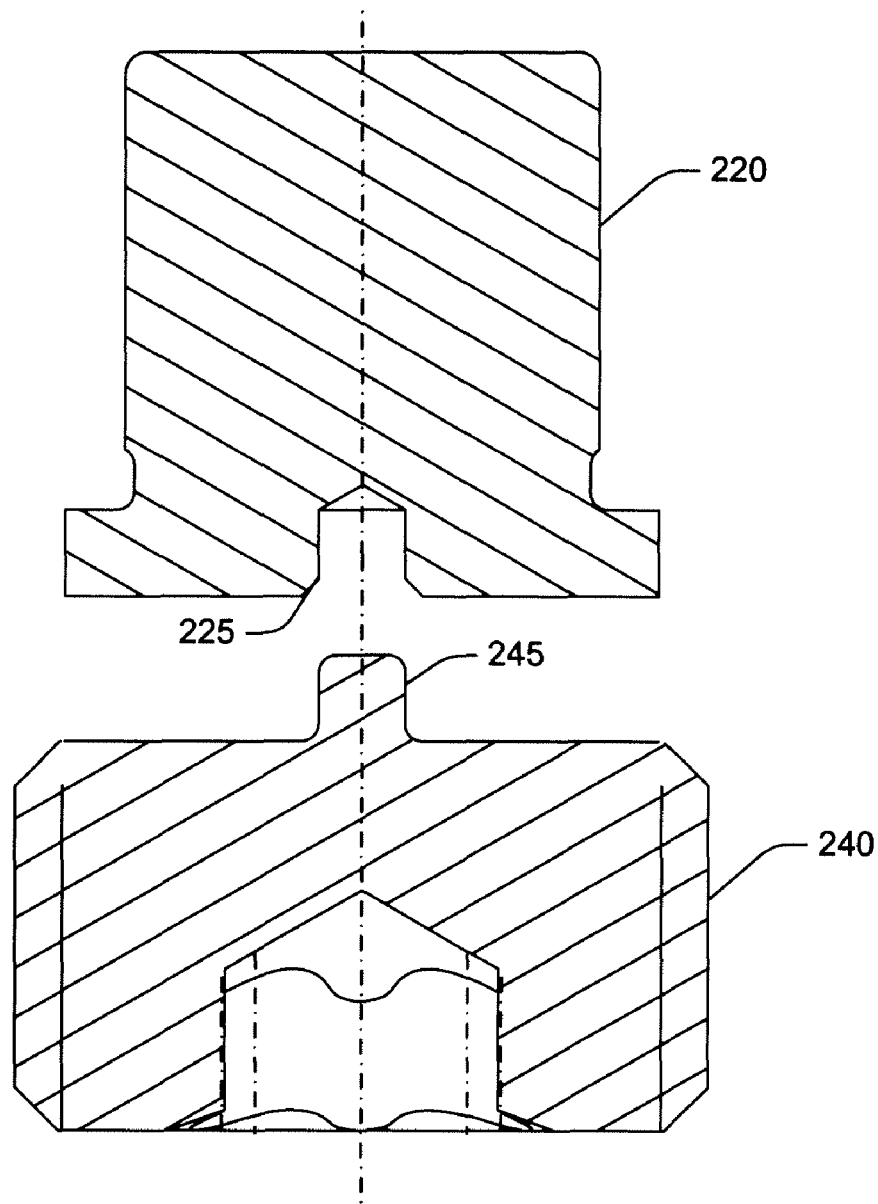
FIG. 3 is an exploded cross-sectional view of the exemplary multi-piece locating pin of FIG. 2.

FIG. 3 shows an exploded cross-sectional view of the exemplary MPLP 200 of FIG. 2. The two pieces 220 and 240 may be joined at any time during an assembly process. For example, the two pieces 220 and 240 may be provided as a unit where the nub 245 forms a compression fit with the receptacle 225 in a manner that allows the MPLC 200 to be handled without any significant risk of the pieces separating prior to insertion of the MPLC 200 into a housing to locate a bearing.

Figure 4:
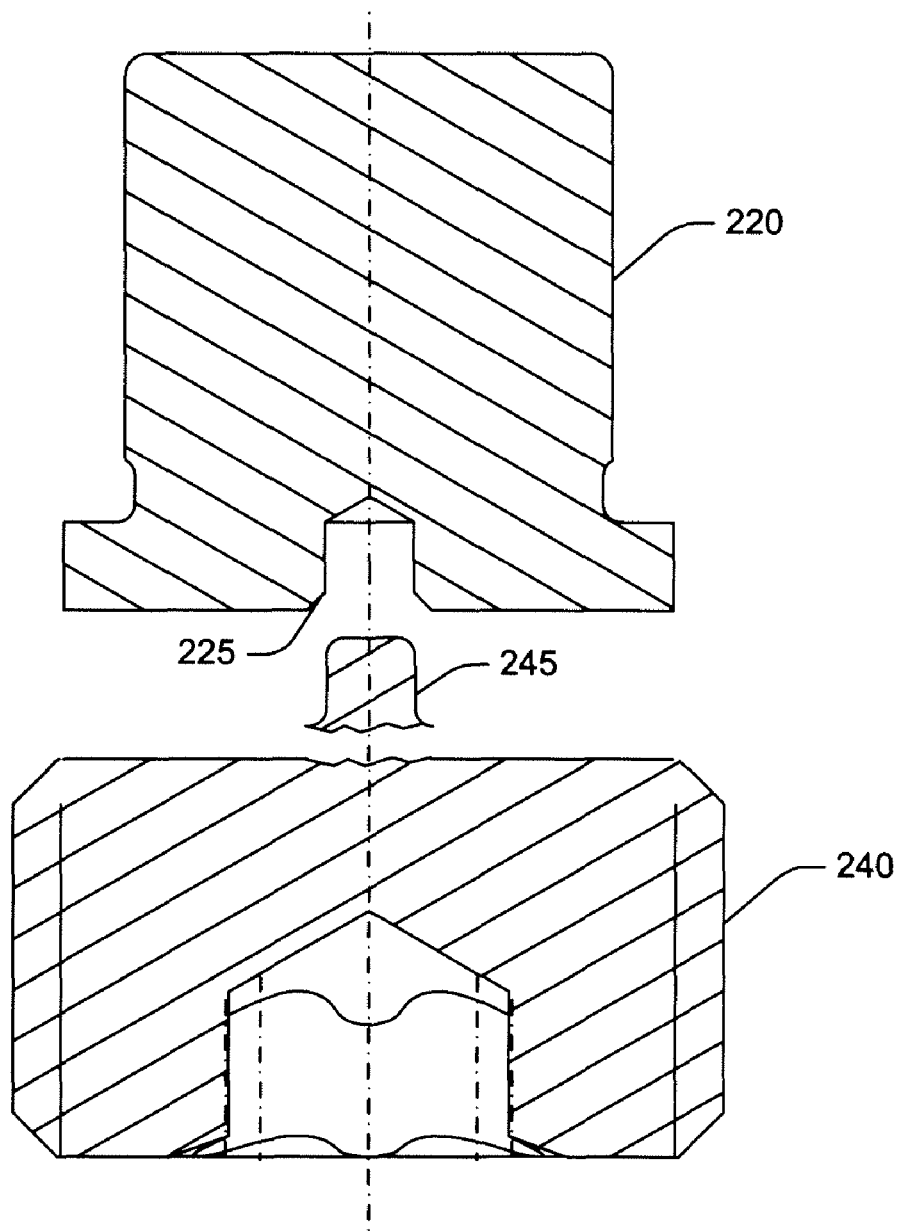
FIG. 4 is an exploded cross-sectional view of an exemplary multi-piece locating pin with a broken nub.

FIG. 4 shows an exploded cross-sectional view of an exemplary MPLP 400 where the nub 245 has been detached from the screw piece 240. For any of a variety of reasons, the nub 245 may be broken and detached from the screw piece 240. For example, prior to insertion in a housing, a worker may receive the MPLP 200 as a unit, separate the pieces 220 and 240 and then optionally break the nub 245.

Figure 5:
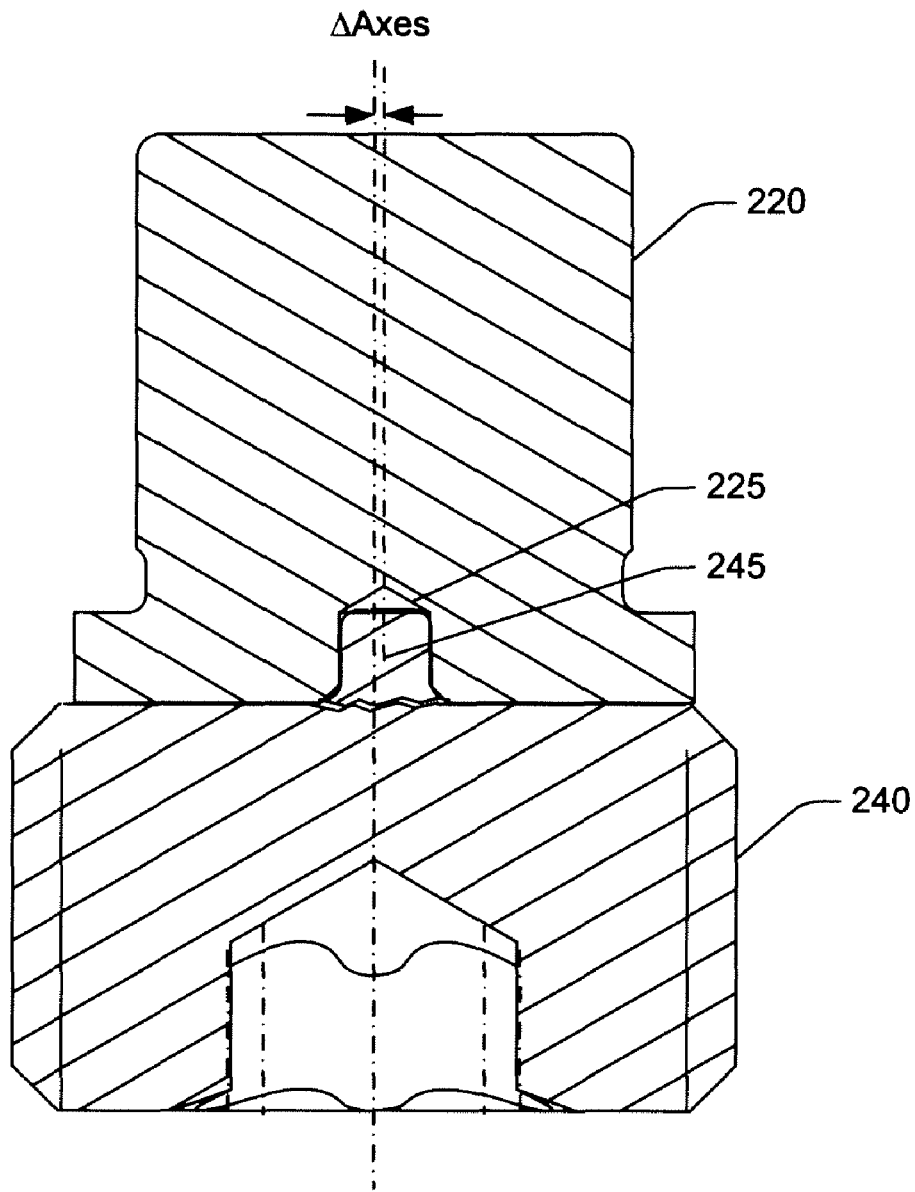
FIG. 5 is a cross-sectional view of an exemplary multi-piece locating pin with a broken and captive nub.

FIG. 5 shows a cross-sectional view of an exemplary MPLP 500 where the nub 245 has be broken, for example, cracked off or otherwise separated from the screw piece 240. Such a situation may arise when a locating pin opening of a bearing does not align with a locating pin opening of a housing. In FIG. 5, two axes are shown as being offset by a distance ΔAxes. In such a situation, the nub 245 may be broken yet held captive by the receptacle 225. Such an arrangement prevents the nub 245 from migrating. Such an arrangement can further hold nub debris captive and prevent such debris from migrating. During assembly or operation, a broken nub and/or associated debris can potentially cause damage to any of a variety of components of a turbocharger.

In various examples, a screw piece may be manufactured with a material of lesser "quality" than a corresponding pin piece. In particular, the pin piece must withstand axial forces and rotational forces exerted by a bearing. Hence, the pin piece must be made of a durable material. As the screw piece is not subject to such forces, directly, it can be made of a less durable material. More specifically, the screw piece may be made of a material that cost less than the material of the pin piece. Further, the screw piece may be made of a material that is easier to machine or form.

Figure 6:
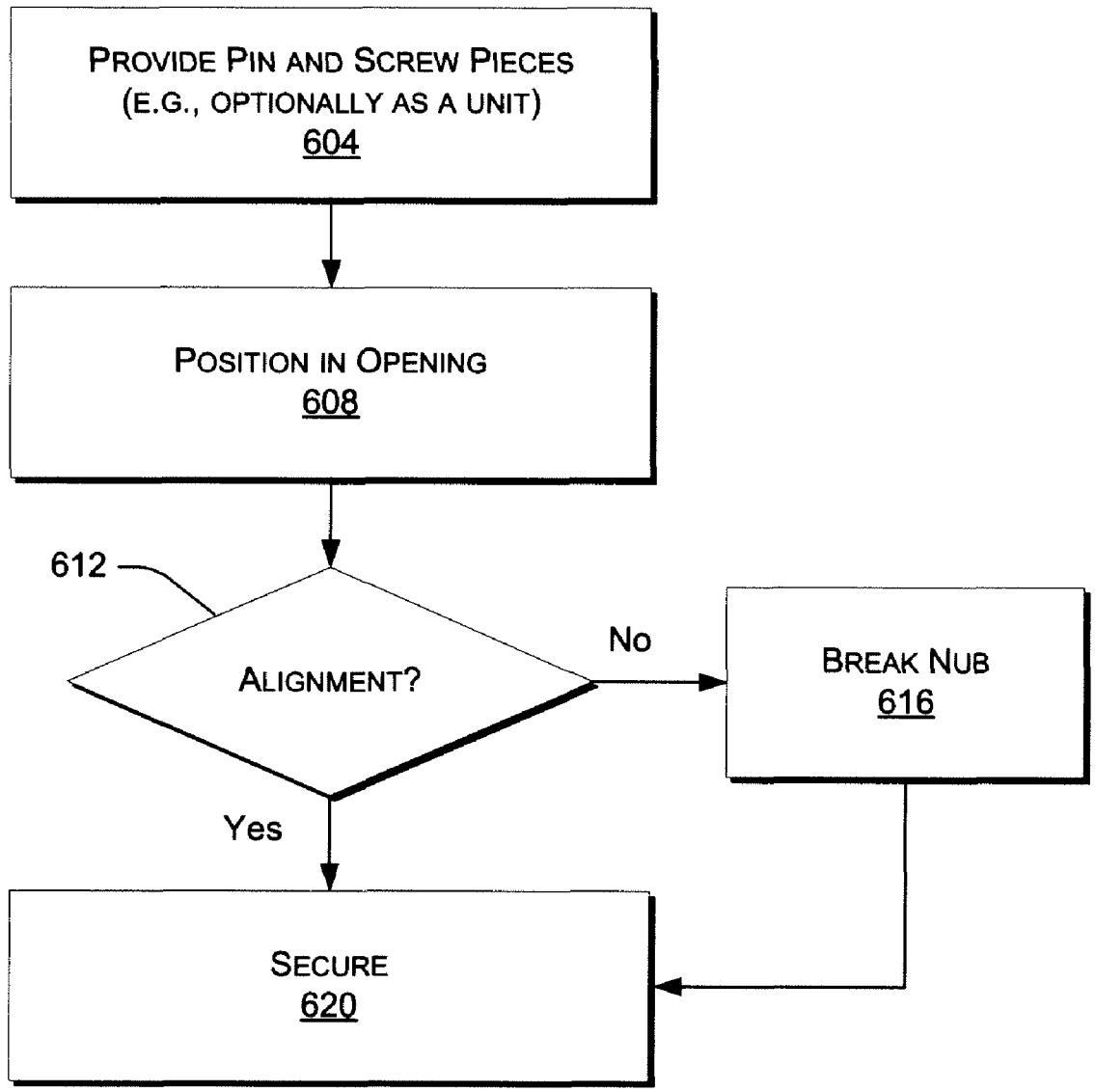
FIG. 6 is a block diagram of an exemplary method.

FIG. 6 shows an exemplary method 600 for securing a multi-piece locating pin in a housing to locate a bearing. The method 600 commences in a provision block 604 that includes providing pin and screw pieces, optionally as a unit. In a position block 608, at least the pin piece is positioned in a locating opening of a bearing where the bearing is positioned in a bore of a housing. In a decision block 612, a decision may be made as to whether the pin piece and the screw piece align. Such a decision may occur by default, for example, when securing the screw piece. Alternatively, such a decision may be made by a machine or a worker upon inspection. In either instance, if the decision block 612 decides that alignment does not exist, then, in a break block 616, the nub is broken and the method 600 continues in a secure block 620 to secure the screw piece and hence the pin piece. In some instances, the process of securing may cause a nub to break. Referring again to the decision block 612, if alignment exists (e.g., sufficient alignment), then the method continues to the secure block 620.

For example, an exemplary method may include providing a multi-piece locating pin; inserting a pin piece of the multi-piece locating pin into an opening in a wall of a bearing positioned in a bore of a housing of a turbocharger assembly; and securing a screw piece of the multi-piece locating pin in an opening of the housing to thereby secure the pin piece and axially locate the bearing in the bore of the housing of the turbocharger assembly. In such a method, the screw piece may include a nub received by a receptacle of the pin piece. Further, the receptacle of the pin piece may receive a broken nub. A broken nub may indicate a misalignment of an axis of the pin piece and an axis of the screw piece. In various examples, a pin piece and a screw piece may abut in the housing (see, e.g., the securing region R1 and the transition region R2).

The invention claimed is:

1. A turbocharger assembly comprising:
a housing that comprises a bore;
a bearing positioned in the bore wherein the bearing comprises a wall opening; a multi-piece locating pin secured to the housing and inserted at least partially in the wall opening to axially locate the bearing in the bore
wherein the multi-piece locating pin comprises
a screw piece that comprises a substantially cylindrical nub and a securing feature to secure the screw piece to the housing and
a pin piece that comprises a substantially cylindrical receptacle configured to receive the nub and a locating surface to locate the bearing in the bore
wherein the nub comprises a detachable nub and wherein the receptacle is configured to retain a detached nub.

2. The turbocharger assembly of claim 1 wherein the pin piece inserts at least partially in the wall opening to axially locate the bearing in the bore.

3. The turbocharger assembly of claim 1 wherein the receptacle holds a broken nub.

4. The turbocharger assembly of claim 1, wherein the screw piece and the pin piece are made of different materials.

5. The turbocharger assembly of claim 1, wherein receipt of the nub by the receptacle does not prevent rotation of the screw piece with respect to the pin piece.

6. The turbocharger assembly of claim 1, wherein the pin piece radially locates a bearing in a bore of the housing.

* * * * *